No. 704,320. Patented July 8, 1902.
C. P. GOERZ.
FOLDING CAMERA WITH ROLL FILM MAGAZINE.
(Application filed May 1, 1901.)
(No Model.) 2 Sheets—Sheet 1.
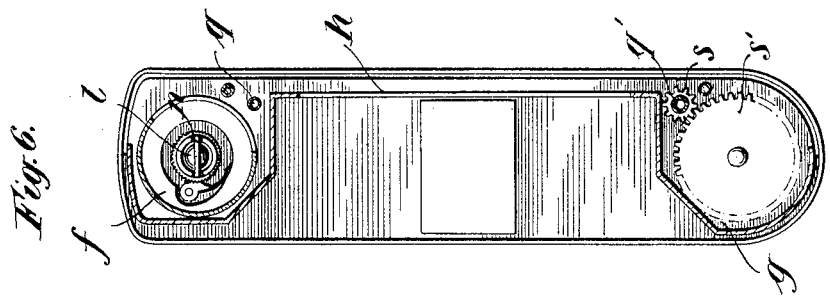
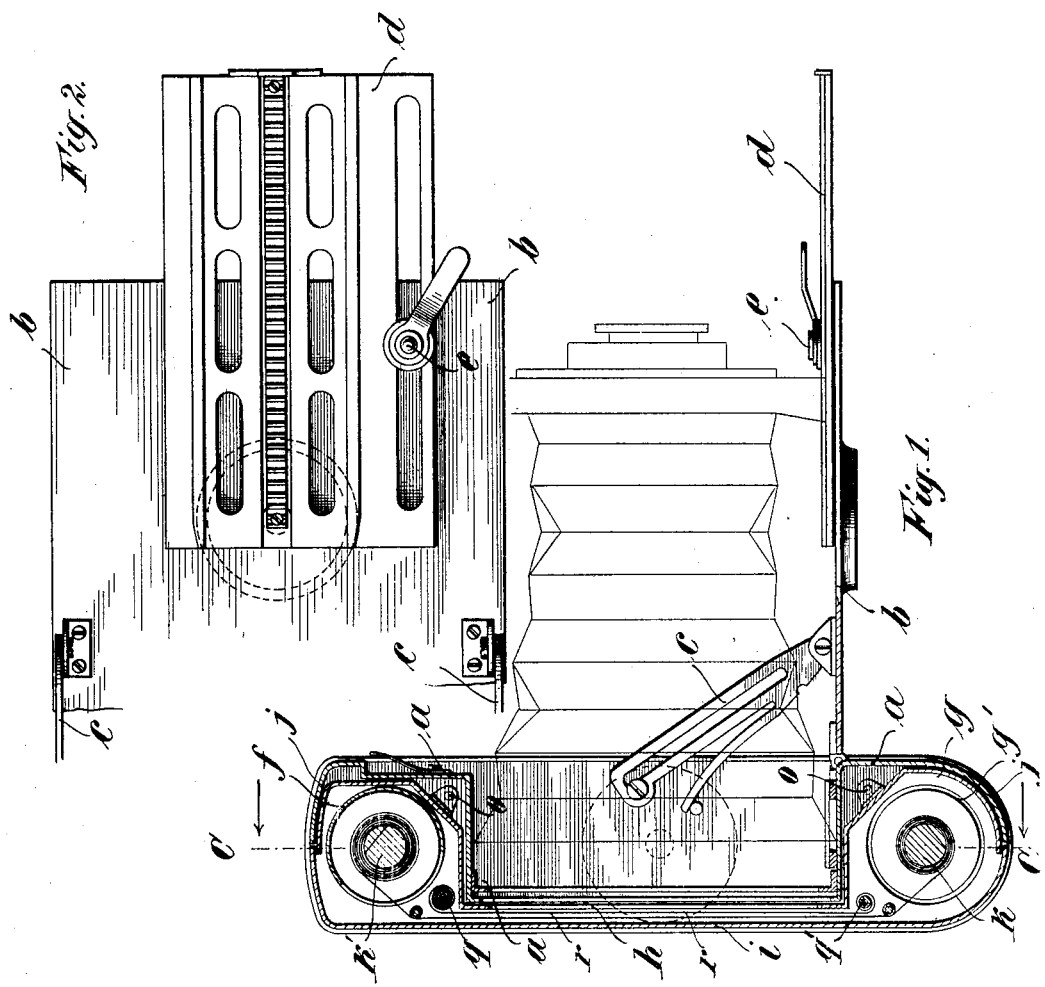
Witnesses:
Inventor:
Carl Paul Goerz
Attorneys.

No. 704,320. Patented July 8, 1902.
C. P. GOERZ.
FOLDING CAMERA WITH ROLL FILM MAGAZINE.
(Application filed May 1, 1901.)
(No Model.) 2 Sheets—Sheet 2.
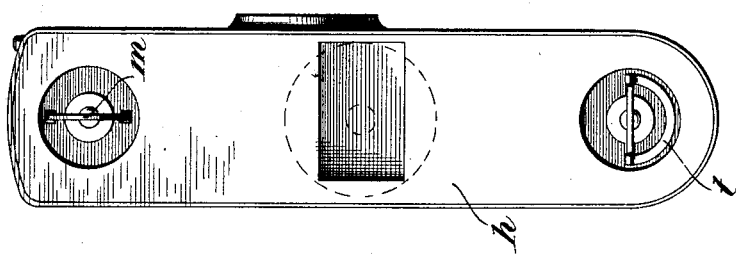
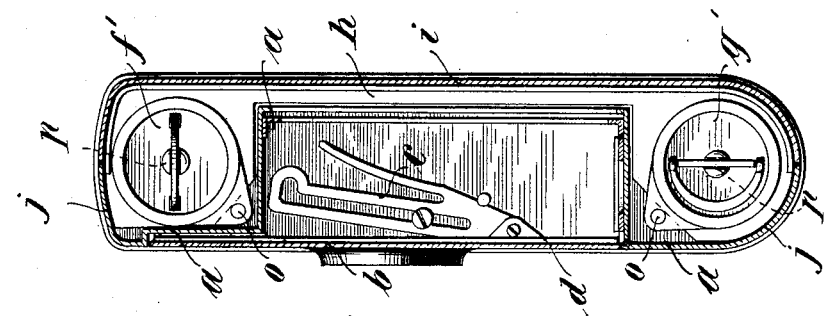
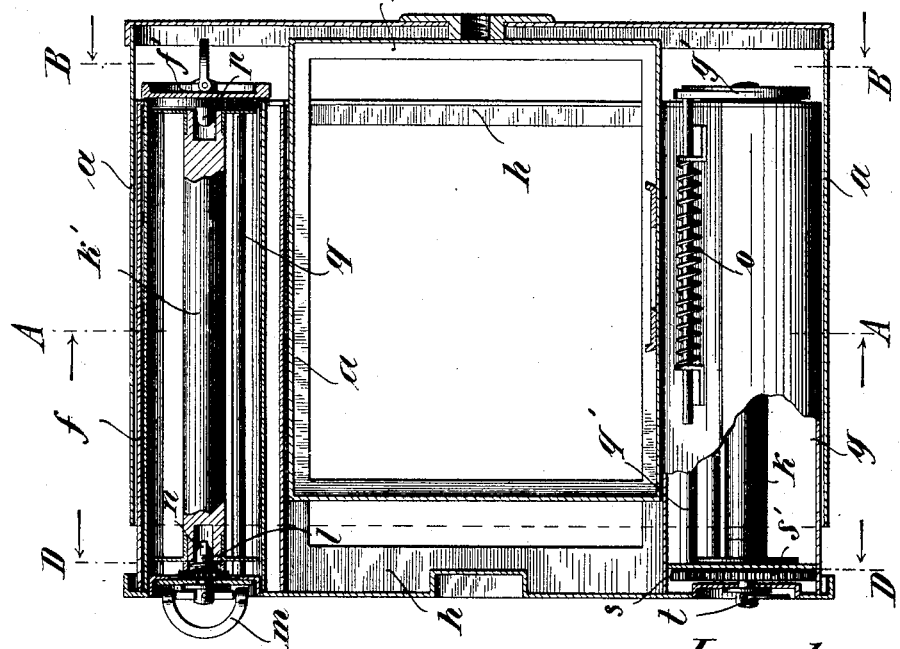
Witnesses:
H. Joseph Doyle
A. S. Brown
Inventor:
Carl Paul Goerz
by Marion & Marion
Attorneys

UNITED STATES PATENT OFFICE.

CARL PAUL GOERZ, OF FRIEDENAU, NEAR BERLIN, GERMANY.

FOLDING CAMERA WITH ROLL-FILM MAGAZINE.

SPECIFICATION forming part of Letters Patent No. 704,320, dated July 8, 1902.

Application filed May 1, 1901. Serial No. 58,321. (No model.)

*To all whom it may concern:*

Be it known that I, CARL PAUL GOERZ, a citizen of the Kingdom of Prussia, and a resident of Friedenau, near Berlin, Germany, (whose post-office address is Rheinstrasse 45/46,) have invented certain new and useful Improvements in Folding Cameras with Roll-Film Magazines, of which the following is a specification.

The present invention relates to a folding camera for photographic purposes which is of peculiar construction and which may be used either in combination with an ordinary dark slide or with a peculiarly-constructed roll-film magazine and to the roll-film magazine used in connection therewith.

In the accompanying drawings this camera is represented in its totality and its details of construction.

Figure 1 is a longitudinal section on line A A of Fig. 3 through the axis of the objective of the camera, the bellows and the objective-board partly broken away. Fig. 2 is a plan view of the guiding for the objective-board, this and the bellows omitted. Fig. 3 is a section of the camera, with the roll-film magazine partly removed therefrom, on line C C of Fig. 1. Figs. 4 to 6 are sections through same on lines B B and D D of Fig. 3 and side views of same, respectively.

$a$ is a frame, to which is hinged a plate $b$, which, corresponding to its position, either closes the open front side of said frame or which, on the contrary, is rigidly held so as to form right angles with same by means of proper automatically-acting stays $c$. The plate $b$ may have on its under side screw-threads, by means of which the apparatus may be fastened in the ordinary way to the tripod. On plate $b$ slides in proper guidings a second plate $d$, which may be fixed in any position with regard to plate $b$ by tightening the screw $e$ or in any other way. This plate $d$ is provided with means for fastening the objective-board thereto, and the focusing is done in the ordinary manner by means of rack and pinion. The bellows are fastened to the rear end of the frame $a$, and their other end is closed by means of the objective-board. In folding the camera this latter, with the bellows, is hidden in the open space inclosed by the frame $a$. On the rear side of frame $a$ are provided guidings for inserting either an ordinary dark slide or a ground-glass pane for focusing purposes. Instead of either of them the camera may be used in combination with a roll-film magazine of peculiar form, the construction of which will be clearly seen from the accompanying drawings and will be particularly described in the following.

Two tubes $f$ and $g$ are rigidly connected to each other by a frame $h$, which is covered by a cover $i$ of proper form. The opening of said frame exactly corresponds to that of frame $a$. Tubes $f$ and $g$ fit exactly above and below said frame $a$, and the connection between both of them is rendered completely light-proof by means of properly-shaped prolongations $j$, fixed to the front wall of frame $a$. Tubes $f$ and $g$ are designed for receiving the film-spools $k$ and $k'$, of which the former is the full one. Tube $f$ is provided at its bottom with a central pivot $l$, having at its outer end a handle $m$ for turning it and at its inner end a catch $n$, which engages a recess of proper form in the empty spool $k'$ and forms the connection between said spool and pivot $l$, thereby enabling the operator to transport the unexposed film from the full spool to the empty one by turning the handle $m$. The inserting of the spools into the tubes is done in a very simple way. One end of said tubes (in Fig. 3, the right one) is closed by a removable cover $f'$ and $g'$, respectively. These covers are solidly connected to rods $o$, guided in proper way on the outside of said tubes $f$ and $g$, and these rods serve as pivots around which said covers may be rotated. Coiled springs, pressing with one end against an abutment on the wall of the tubes and with the other one against a collar provided in the lower part of the rods $o$, hold the covers tightly against the open sides of the tubes $f$ and $g$, thereby securing the light-proof closing of same. Pins $p$, arranged in the centers of said covers, engage recesses in the ends of the spools $k$ and $k'$, thereby securing their position in the tubes and at the same time serving as pivots around which the spools rotate.

In order to be able to remove the roll-film magazine from the camera—for example, when focusing the same with the aid of a ground-glass pane inserted into the guidings at the back side of frame $a$—and without spoiling that part of the film just under the frame $h$, means must be provided for protecting same in the meantime from the influence of the daylight. For that purpose at the side of one of the film-tubes is arranged an axis $q$ parallel thereto, to which a light-tight curtain of suitable material is fastened. Properly-arranged springs tend to hold this curtain rolled on said axis. On the other side of frame $h$ is another axis $q'$ arranged parallelly to the former one, and to which are fastened two narrow strips or bands $r$ at the lower and the upper end. The free ends of said strips are fastened to the free edge of the curtain. The end of the axis $q'$ bears a pinion $s$ into which engages another pinion $s'$ of greater diameter, which may be turned by means of a handle $t$ arranged in the axis of one of the film-tubes. By turning said handle in one or the other direction the curtain is either unrolled from axis $q$ or under the influence of the spring acting on said axis drawn to the same. As the friction of the gearing $s\ s'$ is greater than the force of the spring acting on the axis $q$, the latter cannot draw the curtain back by itself. It rather acts only when the handle $t$ is turned in the corresponding sense.

What I claim is—

1. In a folding camera of the kind hereinbefore described, two frames, one foldable within the other and one carrying film-spools and inclosing film-tubes, means for fastening the film-spools in the corresponding film-tubes, comprising removable covers fastened to rods rotatably guided at the outside of the film-tubes, coiled springs slung around said rods pressing with one of their ends against a collar of said rods and with their other one against an abutment arranged on the outside of the film-tube, pressing the cover against the open end of the tube; substantially as shown and described.

2. In a folding camera of the kind hereinbefore described, a removable frame, film-spools carried thereby, film-tubes inclosing said spools, a spring-actuated axis arranged on one side of the frame and having a light-tight curtain fastened thereto; at the other side of the frame arranged a similar axis provided with means for rotating the same; the free end of said curtain being fastened to said second axis by means of bands or strips, and curved prolongations on the camera-frame embracing said tubes and coöperating with the first-mentioned frame.

3. In a folding camera of the kind described, the combination with the tubes, and a frame connecting them, of the camera-frame over which said frame fits, a cover for said connecting-frame, curved prolongations on the camera-frame to form a light-tight connection between the two tubes and frames, film-spools mounted within said tubes, means for rotating said spools and spring-actuated pivots about which said spools rotate, an axis parallel with the axis of the film-tube and a light-tight curtain fastened thereto and movable in the planes parallel with the film, all substantially as shown and described.

In testimony whereof I affix my signature in presence of two witnesses.

CARL PAUL GOERZ.

Witnesses:
 WOLDEMAR HAUPT,
 HENRY HASPER.